Aug. 4, 1931. H. HEIERMANN Re. 18,144

WRIST PIN CONSTRUCTION

Original Filed Feb. 3, 1928

Hugo Heiermann
INVENTOR

BY Mock & Blum
ATTORNEYS.

Reissued Aug. 4, 1931 Re. 18,144

UNITED STATES PATENT OFFICE

HUGO HEIERMANN, OF FRANKFORT-ON-THE-MAIN, GERMANY

WRIST-PIN CONSTRUCTION

Original No. 1,758,515, dated May 13, 1930, Serial No. 251,681, filed February 3, 1928, and in Germany February 4, 1927. Application for reissue filed May 9, 1931. Serial No. 536,280.

My invention relates to means for locking pins, bolts and the like against displacement in their axial direction. Various constructions of locking means have hitherto been proposed with this object in view. They do not, however, fulfill the requirements which are required from such means since known locking means do not permanently ensure the prevention of axial displacement. This drawback is especially noticeable in the case of the connecting pins or wrist-pins used for pistons since as soon as these pins are capable of being axially displaced, they cause the cylinder wall to be gradually worn out at those places where the pin moves during the reciprocating movement of the piston.

The object of the present invention is to provide means which will completely overcome this drawback by constructing the locking means of the pins, bolts or the like in such a manner that the axial displacement thereof will be permanently prevented.

According to the present invention, this object is attained by constructing the locking means in the form of a narrow spring ring being tapered so that it diminishes in thickness towards the open end portions thereof and having a wide middle surface, which spring ring is inserted in a correspondingly narrow annular groove in such a manner that the said spring ring projects with its end surface to such an extent beyond the annular groove that the wide end surface of the ring forms a sure abutment for the bolt, pin or the like which is to be locked in position.

Referring to the accompanying drawings which illustrate different forms of construction of the locking means as applied to two different forms of arrangement for locking the connecting pin of a piston in position.

Figure 3:
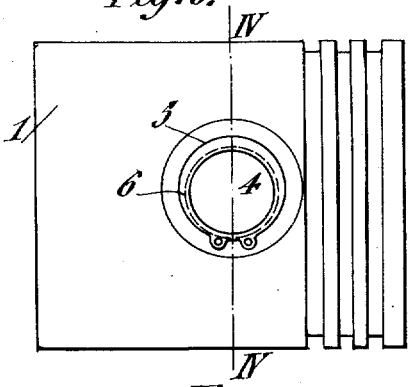
Fig. 3 shows also in side elevation another form of construction of the locking means for the connecting pin of the piston.
Figure 4:
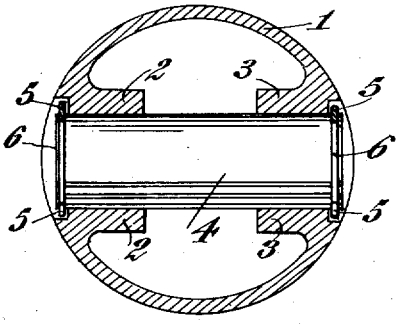

Fig. 4 being a transverse section along the line IV—IV of Fig. 3;

Figs. 5, 6, 7 and 8 show different forms of construction of the spring ring by which the connecting pin of the piston is locked in position.

Figure 1:
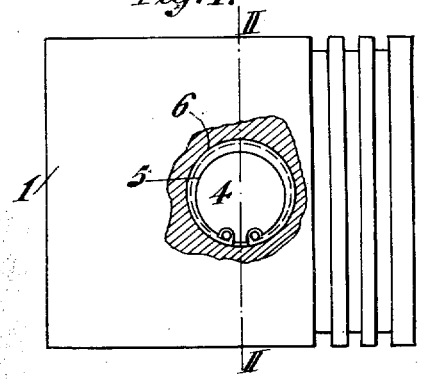
Fig. 1 illustrates in side elevation partly in section, the connecting pin of the piston as provided with locking means according to the present invention, Fig. 2 being a transverse section along the line II—II in Fig. 1.
Figure 2:
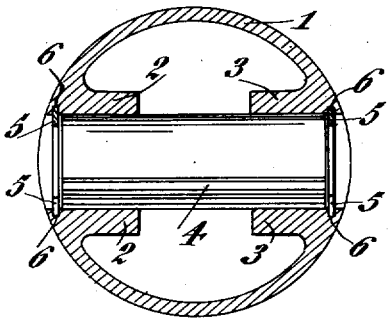

Referring to Figs. 1 to 4, 1 is a piston which is provided with the bearings 2 and 3. 4 is the connecting pin of the piston, which pin is loosely mounted in the bearings 2 and 3. 5, 5 are the spring rings which prevent the axial displacement of the connecting pin 4. 6, 6 are annular grooves in which the spring rings 5 are inserted for the purpose of preventing the axial displacement of the connecting pin 4. The annular grooves 6 may be provided as desired either at the outer end of each one of the two bearings 2 and 3 as shown in Fig. 2, or in the two ends of the connecting pin 4 as shown in Fig. 4. In the first form of construction the connecting pin 4 lies between the two inner end surfaces of the annular springs 5 so that an axial displacement of the pin 4 relative to the piston 1 is prevented. In the second form of construction, in which the annular springs 5 are sprung into the connecting pin 4 they lie with their inner end surfaces against the outer end surfaces of the bearings 2 and 3 which serve as abutments for the connecting pin 4, thereby preventing its axial displacement.

When the spring ring 5 is inserted into one of the annular grooves provided in the bearings 2 and 3, use is made of an elastic ring which springs outwardly, whilst when the annular spring 5 is inserted into a groove provided in the connecting pin 4 use is made of an elastic ring which springs inwardly.

As will be seen from Figs. 2 and 4, the spring ring 5 is made very thin in order to reduce the surface of the bearing of the connecting pin 4 as much as possible. On the other hand, the spring ring 5 as will be seen from Figs. 5 to 8, is formed with a wide end or lateral surface, in order to provide therefor a good seat in the annular groove 6 and to allow it to project beyond the annular groove sufficiently to provide a sufficiently large abutment surface for the connecting pin 4, whereby a lateral displacement thereof is completely prevented.

As will be seen from Figs. 5 to 8, the wide end surface of the ring 5 may be constructed in different ways and the ring may be made of a piece of steel having a circular cross-section or from a flat piece of steel.

Figure 5:
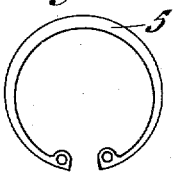
Figure 6:
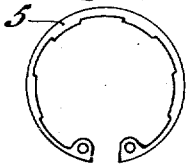
Figure 7:
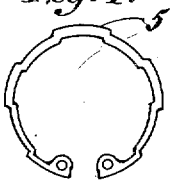
Figure 8:
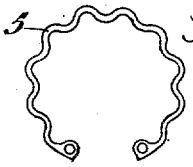

The shape of the ring 5 is such that it possesses sufficient elasticity, so that when it is inserted into the annular groove 6, it will spring sufficiently far back to become clamped in the said groove. As shown in Fig. 5 for example, the lateral surface of the device tapers towards the free ends thereof. This construction increases the springiness of the device so that it is firmly retained in the groove in which it is located. The ends of the device are provided with openings, to enable a tool to be used for inserting or removing the device from the groove in which it is located. Each of the bearings may be considered as a sleeve, the pin 4 being turnably mounted in said sleeves. The end portions of the pin 4 which contact with the inner walls of said sleeves may be defined as the bearing portions.

What I claim is:

1. In combination, a hollow piston having spaced and aligned bearings, a wrist-pin located in said bearings, said wrist-pin being restrained from longitudinal play by spring rings located adjacent the ends thereof and being held against movement relative to said wrist-pin in a direction parallel to its longitudinal axis, each of said spring rings tapering and diminishing in thickness towards the end portions thereof, said end portions being separate from each other and having enlarged heads.

2. In combination, a socket-member having a socket and a pin located in said socket, said pin being restrained from movement in a direction parallel to its longitudinal axis by means of a spring ring which is located in a groove in said pin, said spring ring being tapered so that it diminishes in thickness towards the end portions thereof, said end portions being separate from each other and being adapted to be engaged by a tool or the like.

3. In combination, a socket-member having a socket and a pin located in said socket, said pin being restrained from movement in a direction parallel to its longitudinal axis by means of a spring ring which is located in a groove in said socket, said spring ring being tapered so that it diminishes in thickness towards the end portions thereof, said end portions being separate from each other and being adapted to be engaged by a tool or the like.

In witness whereof I have hereunto affixed my signature.

HUGO HEIERMANN.

.05